No. 661,160. Patented Nov. 6, 1900.
J. M. THORP.
APPARATUS FOR SWELLING STAVES OF WOODEN TANKS.
(Application filed Feb. 21, 1900.)
(No Model.)

WITNESSES.
R. H. Fallmer
Vernor E. Thorp

INVENTOR.
J. M. Thorp

UNITED STATES PATENT OFFICE.

JAMES MADISON THORP, OF ALAMEDA, CALIFORNIA.

APPARATUS FOR SWELLING STAVES OF WOODEN TANKS.

SPECIFICATION forming part of Letters Patent No. 661,160, dated November 6, 1900.

Application filed February 21, 1900. Serial No. 6,090. (No model.)

*To all whom it may concern:*

Be it known that I, JAMES MADISON THORP, a citizen of the United States, residing in the city and county of Alameda, State of California, have invented a new and useful Apparatus for Swelling the Staves of Wooden Tanks and to Prevent the Same from Shrinking, of which the following is a specification.

My invention relates to improvements in distributing the supply-water over the walls of wooden tanks to swell the staves or prevent them from shrinking. I attain this object by the mechanism illustrated in the accompanying drawings, in which—

Figure 1:
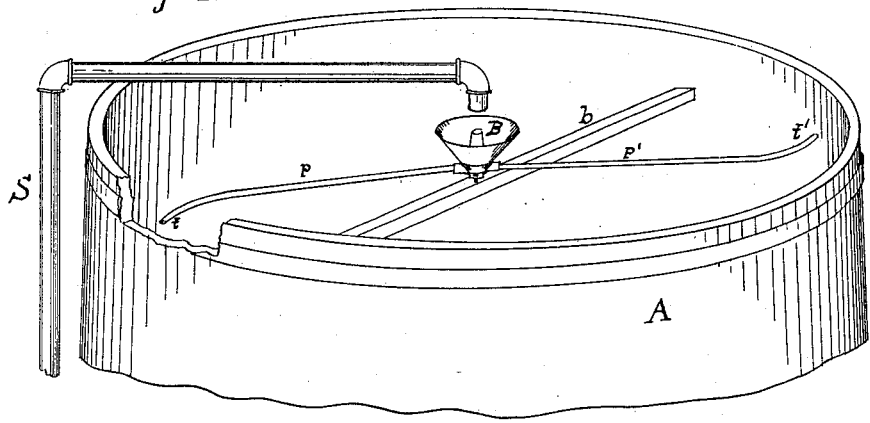
Figure 2:
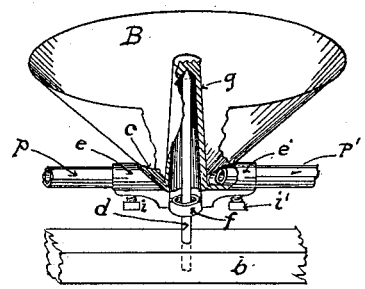

Figure 1 is a perspective view of a wooden tank and supply-pipe with my apparatus shown attached thereto. Fig. 2 is a larger perspective of the central or main portion of the apparatus with parts broken away to show a partial section.

Similar letters refer to similar parts throughout both views.

Across the center of the tank A, Fig. 1, and about ten inches below the top I secure the beam $b$, in the center of which I set vertically the pointed pivot $d$, Fig. 2, on which is adapted to rotate the funnel B, which I construct as follows: The base $c$, the pipe-sockets $e$ $e'$, the guide $f$, and the cone $g$ are made in one casting. The funnel B is made of galvanized sheet-iron and soldered to the base $c$. In the sockets $e$ $e'$, by means of the set-screws $i$ $i'$, I secure the pipes $p$ $p'$, which I bend at the outer ends in opposite directions, as shown at $t$ $t'$, Fig. 1.

In operation the water from the supply-pipe S, Fig. 1, flows into the funnel B, and on running through the pipe-arms is projected in two solid streams against the walls of the tank, and at the same time the force of water flowing through the bent ends causes the pipes and funnel to rotate, thereby distributing the water over the whole inner surface of the tank-walls. This operation requires no extra power to run the pump which supplies the water, as the water flows freely into the funnel, and any surplus water not carried off by the pipes flows over the sides of the funnel into the tank.

From the foregoing description it will be seen that when there is water flowing from the supply-pipe at intervals, even though there is but a small amount of water in the tank, the top will be prevented from shrinking, and in case the supply stops for a considerable length of time and the top of the tank does shrink it is obvious that on the supply being renewed a greater part of the water will flow on the tank-walls and swell the shrunken parts before the water can rise to that height, thus preventing any waste of water and avoiding the necessity of driving the tank-hoops.

Having thus described my invention, what I claim as new, and desire to secure by Letters Patent, is—

1. In a tank-swelling attachment, the funnel B with the base $c$, cone $g$, pipe-sockets $e$, $e'$, guide $f$ and set-screws $i$, $i'$, as shown.

2. In a tank-swelling attachment, the beam $b$, supported across the upper center of a tank in combination with the vertically-projecting pivot $d$, and the funnel B, as shown and described.

3. In a tank-swelling attachment the vertically-projecting and pointed pivot $d$, fixed at the upper center of a tank by means of the beam $b$, and supporting the funnel B which is adapted to receive the tank-supply water and distribute the same over the inner surface of the tank-walls, all as shown and described and for the purpose set forth.

JAMES MADISON THORP.

Witnesses:
R. H. FALLMER,
VERNOR E. THORP.